US012614524B2

(12) United States Patent
Hong

(10) Patent No.: US 12,614,524 B2
(45) Date of Patent: Apr. 28, 2026

(54) DISPLAY DEVICE AND METHOD OF DRIVING SAME

(71) Applicant: LG Display Co., Ltd., Seoul (KR)

(72) Inventor: Moo Kyoung Hong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/917,498

(22) Filed: Oct. 16, 2024

(65) Prior Publication Data

US 2025/0191544 A1 Jun. 12, 2025

(30) Foreign Application Priority Data

Dec. 6, 2023 (KR) ........................ 10-2023-0175489

(51) Int. Cl.
*G09G 3/3233* (2016.01)
*G09G 3/3275* (2016.01)

(52) U.S. Cl.
CPC ....... *G09G 3/3275* (2013.01); *G09G 2310/08* (2013.01); *G09G 2330/10* (2013.01)

(58) Field of Classification Search
CPC .. G09G 3/00; G09G 3/20; G09G 3/32; G09G 3/325; G09G 3/3233; G09G 3/3266; G09G 3/3291; G09G 3/3258; G09G 3/3275; G09G 3/3225; G09G 3/3283; G09G 3/3208; G09G 2310/08; G09G 2310/10
See application file for complete search history.

(56) References Cited

U.S. PATENT DOCUMENTS

2015/0138179 A1* 5/2015 Park ..................... G09G 3/3291 345/212
2020/0074939 A1* 3/2020 Kim ..................... G09G 3/3233
2022/0013072 A1* 1/2022 Kim ..................... G09G 3/3266
2023/0049523 A1 2/2023 Hong
2023/0215335 A1 7/2023 Park et al.

FOREIGN PATENT DOCUMENTS

KR 10-2018-0025798 A 3/2018
KR 10-2023-0025104 A 2/2023

* cited by examiner

*Primary Examiner* — Chanh D Nguyen
*Assistant Examiner* — Nguyen H Truong
(74) *Attorney, Agent, or Firm* — Birch, Stewart, Kolasch & Birch, LLP

(57) ABSTRACT

A display device can include a display panel including a subpixel having a switching transistor connected to a data line and a sensing transistor connected to a reference line, a driving circuit connected to the data line, a sensing circuit connected to the reference line; and a timing controller. Also, the sensing circuit is configured to in response to applying a first reference voltage to the subpixel during a first sensing period, acquire a first sensing voltage charged in the reference line as a first sampling value when the switching and sensing transistors are turned on and acquire the first sensing voltage charged in the reference line as a second sampling value when the switching and sensing transistors are turned off, and the timing controller determines that the display device has a defect based on a first difference value between the first sampling value and the second sampling value.

20 Claims, 17 Drawing Sheets

DISPLAY DEVICE AND METHOD OF DRIVING SAME

CROSS-REFERENCE TO RELATED APPLICATION

This application claims priority to Korean Patent Application No. 10-2023-0175489, filed in the Republic of Korea, on Dec. 6, 2023, the entirety of which is hereby incorporated by reference into the present application as if fully set forth herein.

BACKGROUND

Field

The present disclosure relates to a display device and a method of driving the same.

Discussion of the Related Art

As information technology develops, the market for display devices, which are communication media between users and information, is growing. Accordingly, display devices such as a light emitting display (LED) device, a quantum dot display (QDD) device, and a liquid crystal display (LCD) device are increasingly used.

The display devices described above include a display panel including subpixels, a driver outputting driving signals for driving the display panel, and a power supply for generating power to be supplied to the display panel or the driver.

In such display devices, when driving signals, for example, a scan signal and a data signal, are supplied to subpixels formed in a display panel, selected subpixels transmit light or directly emit light, thereby displaying an image.

However, subpixels in display devices can have different or non-uniform characteristics and can degrade over time. Thus, a need exists for a display device that can accurately determine defective subpixels and provide compensation, and improve driving stability and reliability and extend the lifespan of the display device.

SUMMARY OF THE DISCLOSURE

Accordingly, the present disclosure is directed to a display device and a method of driving the same that substantially obviate one or more problems due to limitations and disadvantages of the related art.

An object of the present disclosure is to improve driving stability and driving reliability of a display device as well as improving the lifespan of the display device.

Additional advantages, objects, and features of the present disclosure will be set forth in part in the description which follows and in part will become apparent to those having ordinary skill in the art upon examination of the following or can be learned from practice of the present disclosure. The objectives and other advantages of the present disclosure can be realized and attained by the structure particularly pointed out in the written description and claims hereof as well as the appended drawings.

To achieve these objects and other advantages and in accordance with the purpose of the present disclosure, as embodied and broadly described herein, a display device includes a display panel including a subpixel having a switching transistor connected to a data line and a sensing transistor connected to a reference line, a driving circuit connected to the data line, a sensing circuit connected to the reference line, and a timing controller configured to control at least one of the driving circuit and the sensing circuit, wherein the sensing circuit is configured to, in a first sensing period in which a first reference voltage is applied through the reference line, acquire a first sensing voltage charged in the reference line during a period in which the switching transistor and the sensing transistor are turned on as a first sampling value and acquire the first sensing voltage charged in the reference line during a period in which the switching transistor and the sensing transistor are turned off as a second sampling value, and the timing controller is configured to determine whether a display module including the display panel has a defect based on a first difference value between the first sampling value and the second sampling value.

The sensing circuit can be configured to, in a second sensing period in which a second reference voltage different than the first reference voltage is applied through the reference line in a state in which the switching transistor and the sensing transistor are turned off, acquire a second sensing voltage charged in the reference line during a period in which the second reference voltage is applied as a third sampling value and acquire the second sensing voltage charged in the reference line during a period in which the second reference voltage is not applied as a fourth sampling value.

The display device can further include a data driver including the driving circuit and the sensing circuit, and the timing controller for controlling the data driver can be configured to secondarily determine whether the display module including the display panel has a defect based on a second difference value between the third sampling value and the fourth sampling value.

The second sensing period can be provided when the first difference value is present between the first sampling value and the second sampling value and skipped when the first difference value is not present.

The first sensing period and the second sensing period can be included in a driving start period in which power is applied to the display panel.

The first sensing period and the second sensing period can be included in a driving termination period in which power applied to the display panel is cut off.

The first sensing period can be included in a driving start period in which power is applied to the display panel, and the second sensing period can be included in a driving termination period in which power applied to the display panel is cut off.

In another aspect of the present disclosure, a method of driving the display device includes applying a first reference voltage through the reference line, acquiring a first sensing voltage charged in the reference line during a period in which the switching transistor and the sensing transistor are turned on as a first sampling value, and acquiring the first sensing voltage charged in the reference line during a period in which the switching transistor and the sensing transistor are turned off as the second sampling value, and determining whether a display module including the display panel has a defect based on a first difference value between the first sampling value and a second sampling value.

The method can further include applying a second reference voltage different from the first reference voltage through the reference line in a state in which the switching transistor and the sensing transistor are turned off, and acquiring a second sensing voltage charged in the reference line during a period in which the second reference voltage is applied as a third sampling value, and acquiring the second sensing voltage charged in the reference line during a period in which the second reference voltage is not applied as a fourth sampling value.

The method can further include determining whether the display module including the display panel has a defect based on a second difference value between the third sampling value and the fourth sampling value.

It is to be understood that both the foregoing general description and the following detailed description of the present disclosure are examples and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION OF THE EMBODIMENTS

A display device according to the present disclosure can be implemented as a television system, an image player, a personal computer (PC), a home theater, an automobile electric device, a smartphone, or the like, but is not limited thereto. The display device according to the present disclosure can be implemented as a light emitting display (LED) device, a quantum dot display (QDD) device, a liquid crystal display (LCD) device, or the like. However, for convenience of description, as an example, a light emitting display device that directly emits light based on inorganic light emitting diodes or organic light emitting diodes will be described below.

The features of various embodiments of the present disclosure can be partially or entirely coupled to or combined with each other and can be interlocked and operated in technically various ways, and the embodiments can be carried out independently of or in association with each other. Also, the term "can" used herein includes all meanings and definitions of the term "may."

Figure 1:
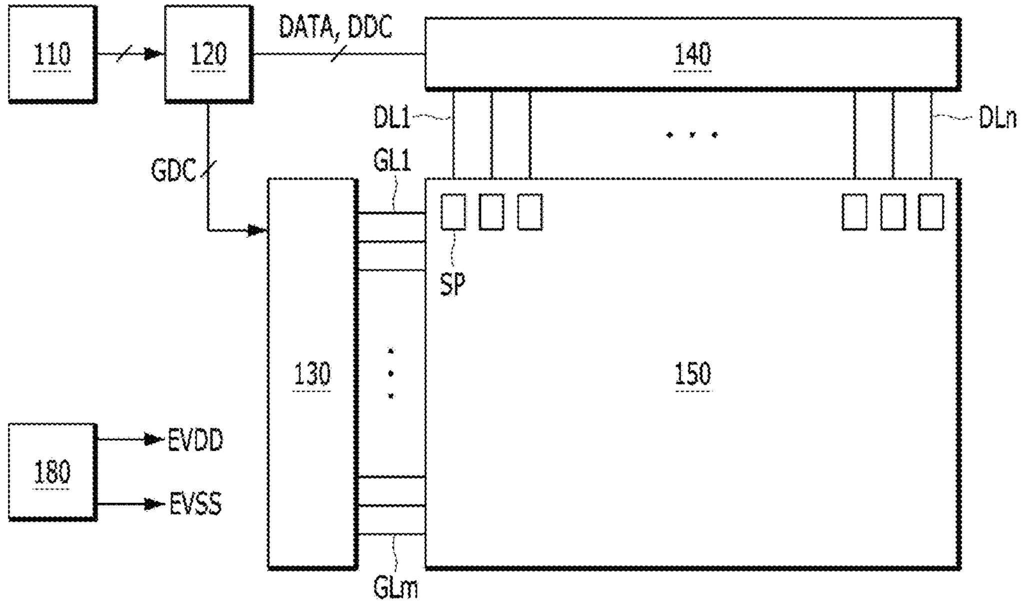
FIG. 1 is a block diagram schematically showing a light emitting display device according to an embodiment of the present disclosure.
Figure 2:
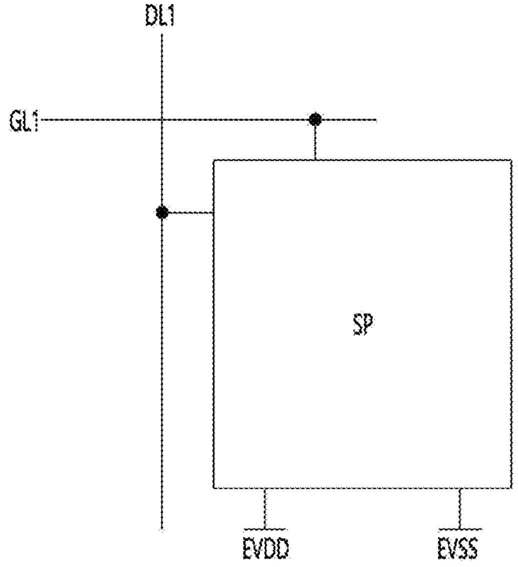
FIG. 2 is a configuration diagram schematically showing a subpixel shown in FIG. 1 according to an embodiment of the present disclosure.
Figure 3:
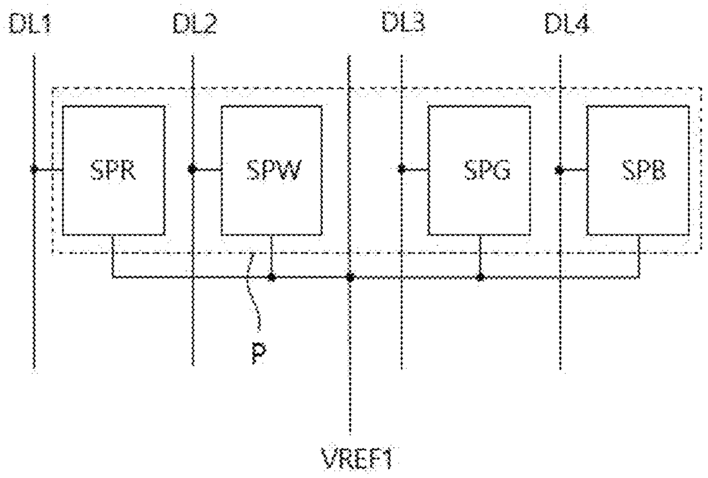
FIG. 3 is a diagram illustrating a pixel composed of subpixels according to an embodiment of the present disclosure.

FIG. 1 is a block diagram schematically showing a light emitting display device, FIG. 2 is a configuration diagram schematically showing a subpixel shown in FIG. 1, and FIG. 3 is a diagram showing a pixel composed of subpixels.

As illustrated in FIG. 1, FIG. 2, and FIG. 3, the light emitting display device can include an image provider 110, a timing controller 120, a gate driver 130, a data driver 140, a display panel 150, a power supply 180, and the like.

The image provider 110 (e.g., a set or a host system) can output various driving signals along with an externally supplied image data signal or an image data signal stored in an internal memory. The image provider 110 can supply data signals and various driving signals to the timing controller 120.

The timing controller 120 can output a gate timing control signal GDC for controlling the operation timing of the gate driver 130, a data timing control signal DDC for controlling the operation timing of the data driver 140, and various synchronization signals. The timing controller 120 can supply a data signal DATA supplied from the image provider 110 to the data driver 140 along with the data timing control signal DDC. The timing controller 120 can be implemented in the form of an integrated circuit (IC) and mounted on a printed circuit board, but is not limited thereto.

The gate driver 130 can output a gate signal (or a gate voltage) in response to the gate timing control signal GDC supplied from the timing controller 120. The gate driver 130 can supply gate signals to subpixels included in the display panel 150 through gate lines GL1 to GLm, where m is a real number. The gate driver 130 can be implemented in the form of an IC or directly formed on the display panel 150 in a gate-in-panel structure, but is not limited thereto.

The data driver 140 can sample and latch the data signal DATA in response to the data timing control signal DDC supplied from the timing controller 120, convert the digital data signal into an analog data voltage based on a gamma reference voltage, and output the analog data voltage. The data driver 140 can supply data voltages to the subpixels included in the display panel 150 through data lines DL1 to DLn, where n is a real number. The data driver 140 can be implemented in the form of an integrated circuit (IC) and mounted on the display panel 150 or mounted on a printed circuit board, but is not limited thereto. Also, one or more of the data driver 140, the gate driver 130 and the timing controller 120 can be collectively referred to as a controller (e.g., a controller connected to the display panel).

The power supply 180 can generate first power at a high level and second power at a low level based on an external input voltage supplied from the outside. The power supply 180 can output the first power through a first power line EVDD and output the second power through a second power line EVSS. The power supply 180 can generate and output voltages (e.g., a scan high voltage and a scan low voltage) to drive the gate driver 130 and voltages (e.g., a drain voltage and a half drain voltage) to drive the data driver 140 as well as the first power and the second power.

The display panel 150 can display an image in response to driving signals including a scan signal and a data voltage, the first power, and the second power. The subpixels of the display panel 150 can directly emit light (e.g., no backlight unit needed). The display panel 150 can be manufactured based on a substrate having rigidity or flexibility, such as glass, silicon, polyimide, or the like. For example, one subpixel SP can be connected to the first data line DL1, the first gate line GL1, the first power line EVDD, and the second power line EVSS and can include a pixel circuit including a switching transistor, a driving transistor, a capacitor, an organic light emitting diode, etc.

Subpixels SP used in the light-emitting display device directly emit light, and thus the circuit configuration thereof may be complicated. In addition, there are various compensation circuits that compensate for deterioration of not only the organic light emitting diode emitting light but also the driving transistor that supplies a driving current to drive the organic light emitting diode. Therefore, the subpixel SP is simply shown in the form of a block.

Subpixels emitting light can be composed of red, green, and blue pixels or red, green, blue, and white pixels. For example, one pixel P can include a red subpixel SPR connected to the first data line DL1, a white subpixel SPW connected to the second data line DL2, a green subpixel SPG connected to the third data line DL3, and a blue subpixel SPB connected to the fourth data line DL4. Additionally, the red subpixel SPR, white subpixel SPW, green subpixel SPG, and blue subpixel SPB can be commonly connected to a first reference line VREF1. The first reference line VREF1 can be used to sense deterioration of elements included in one of the red subpixel SPR, white subpixel SPW, green subpixel SPG, and blue subpixel SPB, which will be described below.

Meanwhile, the timing controller 120, the gate driver 130, and the data driver 140 have been described as individual components. However, depending on the implementation method of the light emitting display device, one or more of the timing controller 120, the gate driver 130, and the data driver 140 can be integrated into a single integrated circuit (IC). In addition, the timing controller 120, the gate driver 130, the data driver 140, the power supply 180, and the display panel 150 are an assembly for displaying images and can be defined as a display module.

In addition, as an example, the pixels P in which the red subpixel SPR, white subpixel SPW, green subpixel SPG, and blue subpixel SPB are arranged in order has been illustrated. However, the arrangement order and direction of subpixels can vary depending on the implementation method of the light emitting display device.

Figure 4:
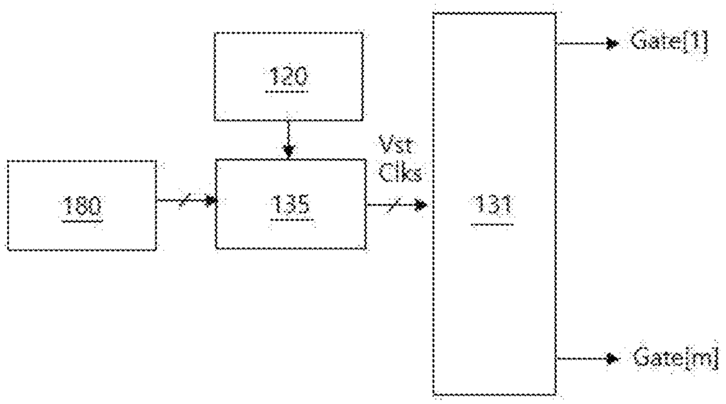
FIG. 4 and FIG. 5 are diagrams illustrating the configuration of a gate-in-panel type gate driver according to embodiments of the present disclosure.
Figure 5:
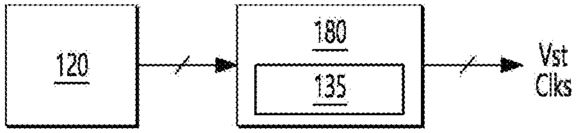
Figure 6:
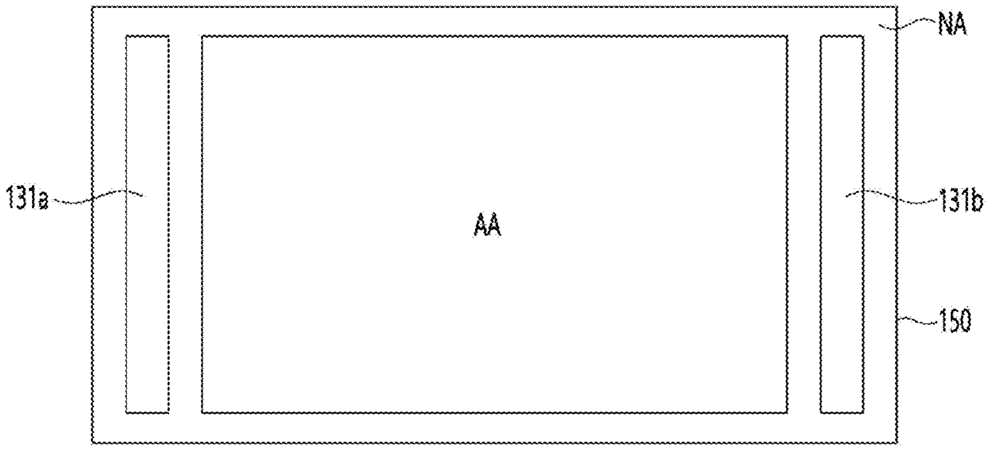
FIG. 6 is a diagram showing an example of the arrangement of the gate-in-panel type gate driver according to an embodiment of the present disclosure.

FIG. 4 and FIG. 5 are diagrams illustrating the configuration of a gate-in-panel type gate driver, and FIG. 6 is a diagram showing an example of the arrangement of the gate-in-panel type gate driver.

As shown in FIG. 4, the gate-in-panel type gate driver can include a shift register 131 and a level shifter 135. The level shifter 135 can generate driving clock signals Clks and a start signal Vst based on signals and voltages output from the timing controller 120 and the power supply 180.

The shift register 131 operates based on signals Clks and Vst output from the level shifter 135, and can output gate signals Gate[1] to Gate[m] for turning on or off transistors formed in the display panel. The shift register 131 can take the form of a thin film on the display panel in a gate-in-panel structure.

As shown in FIG. 4 and FIG. 5, unlike the shift register 131, the level shifter 135 can be formed independently in the form of an IC or can be included in the power supply 180. However, this is merely an example and is not limited to thereto.

As shown in FIG. 6, shift registers 131*a* and 131*b* that output gate signals in the gate-in-panel type gate driver can be disposed in a non-display area NA of the display panel 150. As an example, the shift registers 131*a* and 131*b* are disposed in the left and right non-display areas NA of the display panel 150, but the shift registers 131*a* and 131*b* can also be disposed in upper and lower non-display areas NA of the display panel 150 or can be disposed within a display area AA of the display panel 150.

Figure 7:
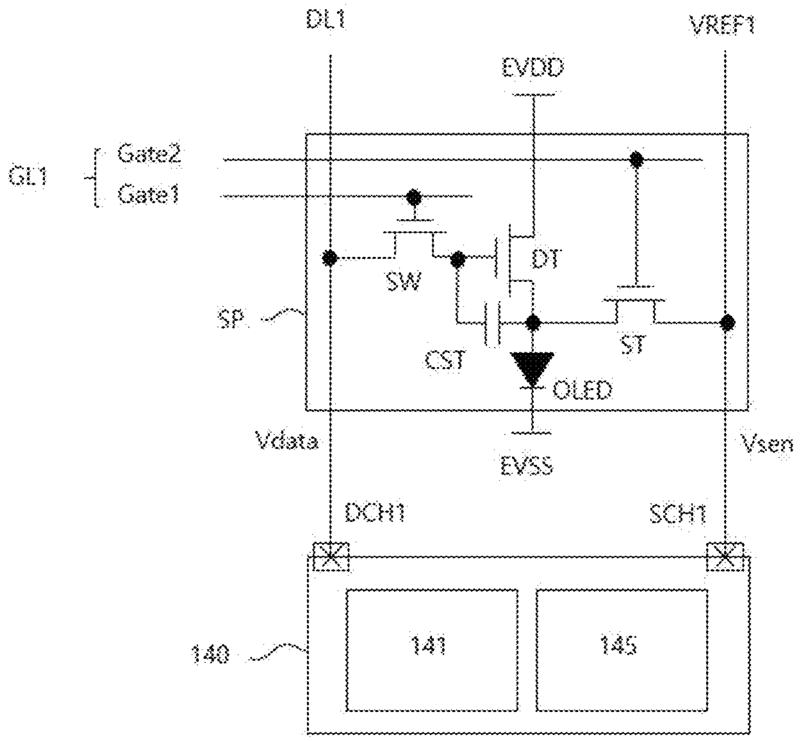
FIG. 7 is a diagram schematically showing a subpixel and a data driver according to an embodiment of the present disclosure.
Figure 8:
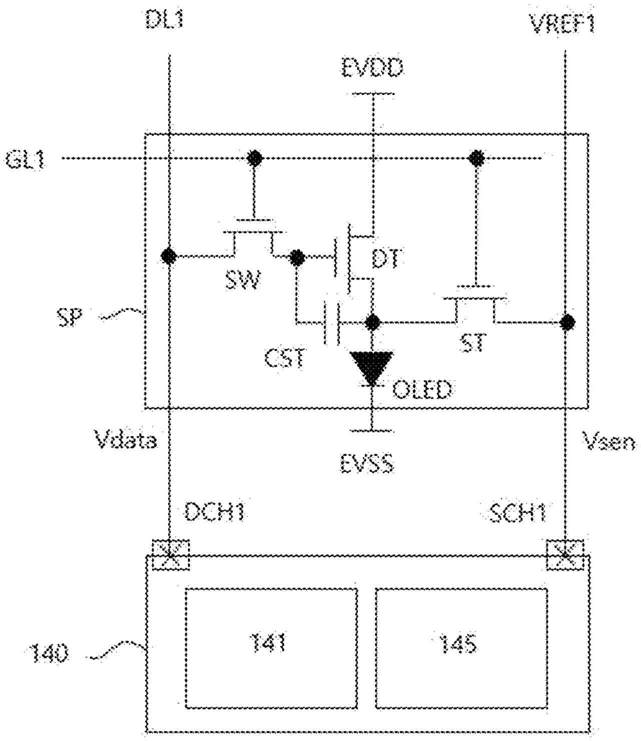
FIG. 8 is a diagram schematically showing a subpixel and a data driver according to an embodiment of the present disclosure and FIG. 9 is a waveform diagram illustrating a sensing period and a display period according to an embodiment of the present disclosure.
Figure 9:
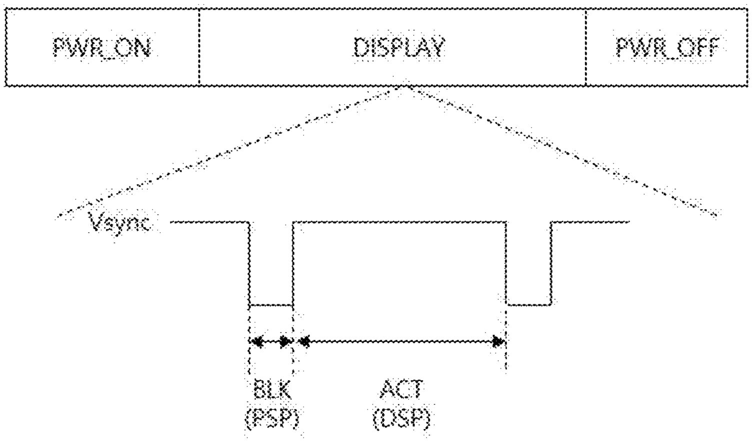

FIG. 7 is a diagram schematically showing a subpixel SP and a data driver 140 according to a first example of an embodiment, FIG. 8 is a diagram schematically showing a subpixel SP and a data driver 140 according to a second example of the embodiment, and FIG. 9 is a waveform diagram illustrating a sensing period and a display period according to an embodiment of the present disclosure.

As shown in FIG. 7, according to the first example, one subpixel SP can include a switching transistor SW, a driving transistor DT, a sensing transistor ST, a capacitor CST, and an organic light emitting diode OLED.

The driving transistor DT can include a gate electrode connected to a first electrode of the capacitor CST, a first electrode connected to the first power line EVDD, and a second electrode connected to the anode of the organic light emitting diode OLED. The capacitor CST can have the first electrode connected to the gate electrode of the driving transistor DT and a second electrode connected to the anode electrode of the organic light emitting diode OLED. The organic light emitting diode OLED can have the anode connected to the second electrode of the driving transistor DT and a cathode connected to the second power line EVSS.

The switching transistor SW can include a gate electrode connected to a first scan line Gate1 included in the first gate line GL1, a first electrode connected to the first data line DL1, and a second electrode connected to the gate electrode of the driving transistor DT. The sensing transistor ST can include a gate electrode connected to a second scan line Gate2 included in the first gate line GL1, a first electrode connected to the first reference line VREF1, and a second electrode connected to the anode of the organic light emitting diode OLED.

The sensing transistor ST is a type of compensation circuit added to compensate for deterioration (e.g., in the threshold voltage, mobility, etc.) of the driving transistor DT or the organic light emitting diode OLED. The sensing transistor ST can enable physical threshold voltage sensing based on the source follower operation of the driving transistor DT. The sensing transistor ST can operate to acquire a sensing voltage through a sensing node defined between the driving transistor DT and the organic light emitting diode OLED.

According to an embodiment, the data driver 140 can include a driving circuit 141 for driving the subpixel SP and a sensing circuit 145 for sensing the subpixel SP. The driving circuit 141 can be connected to the first data line DL1 through a first data channel DCH1. The driving circuit 141 can output a data voltage Vdata for driving the subpixel SP through the first data channel DCH1.

The sensing circuit 145 can be connected to the first reference line VREF1 through a first sensing channel SCH1. The sensing circuit 145 can acquire a sensing voltage Vsen sensed from the subpixel SP through the first sensing channel SCH1. The sensing circuit 145 can acquire the sensing voltage Vsen based on a current sensing or voltage sensing method.

As shown in FIG. 8, according to the second example, the first gate line GL1 can be integrated into one. That is, unlike the first example, the first gate line GL1 may not be divided into the first scan line and the second scan line. In this situation, the switching transistor SW and the sensing transistor ST are both connected to the first gate line GL1 in common, and thus can be turned on or off at the same time.

As shown in FIG. 9, the light emitting display device according to the embodiment can adopt driving modes respectively corresponding to a first operation period PWR_ON (e.g., when powering on the display device), a second operation period DISPLAY, and a third operation period PWR_OFF when operating to drive the display panel (e.g., when powering off the display device).

In more detail, the first operation period PWR_ON can correspond to a driving start period in which power is applied to the display panel, the second operation period DISPLAY can correspond to a panel driving period in which operation such as displaying an image is performed after the power is applied to the display panel, and a third operation period PWR_OFF can correspond to a driving end period in which the power applied to the display panel is cut off. Meanwhile, the third operation period PWR_OFF is a period in which the display panel is driven for a certain period of time while displaying black such that the sensing operation of the display panel can be performed. That is, note that the power applied to the display panel and the like is not completely cut off during the third operation period PWR_OFF. In this way, it can appear to the user that the light emitting display apparatus immediately shuts down in response to an off instruction, but the light emitting display apparatus displays black (displays nothing) but remains on while carrying out the sensing operation before finally shutting down.

The light emitting display device according to the embodiment can sense the display panel in at least one of the first operation period PWR_ON, the second operation period DISPLAY (e.g., during the BLK period), and the third operation period PWR_OFF. As an example, in the second operation period DISPLAY, a blank period BLK included in the vertical synchronization signal Vsync can be defined as a sensing period PSP, and an active period ACT included in the vertical synchronization signal Vsync can be defined as a display period DSP.

Figure 10:
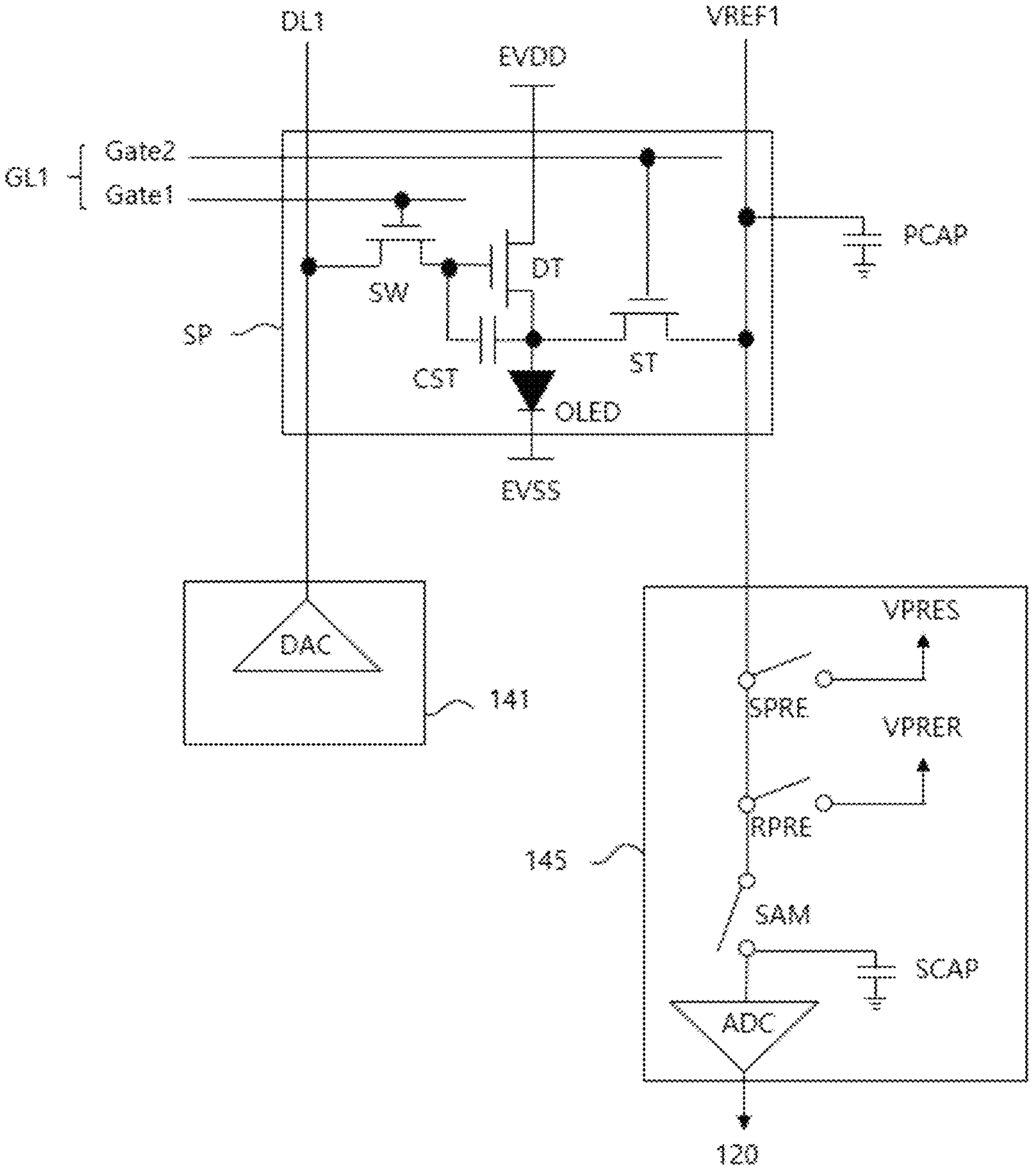
FIG. 10 is a diagram showing some of components included in the data driver according to an embodiment of the present disclosure in more detail.
Figure 11:
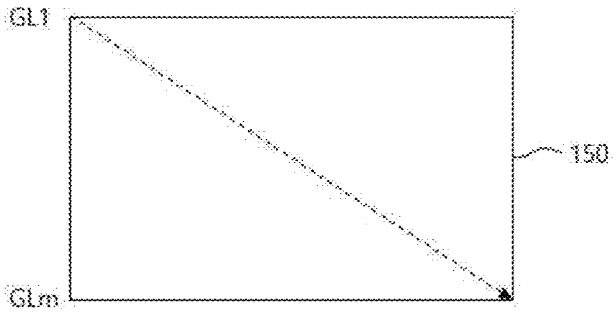
FIG. 11 and FIG. 12 are diagrams showing a method of sensing a display panel according to embodiments of the present disclosure.
Figure 12:
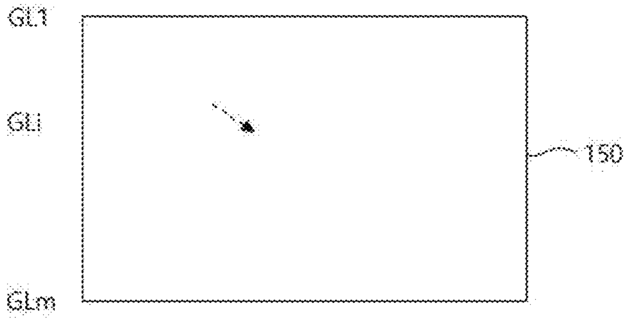

FIG. 10 is a diagram showing some of the components included in the data driver according to an embodiment in more detail, and FIG. 11 and FIG. 12 are diagrams showing a method of sensing the display panel according to embodiments. Hereinafter, as an example, the structure of the subpixel SP shown in FIG. 7 will be described.

As in the embodiment shown in FIG. 10, the driving circuit 141 can include a digital-to-analog converter DAC to output a sensing data voltage, a black data voltage, or a display data voltage through the first data line DL1. The sensing circuit 145 can include a first voltage circuit SPRE, a second voltage circuit RPRE, a sampling circuit SAM, and an analog-to-digital converter ADC to output and sense a voltage through the first reference line VREF1.

The first voltage circuit SPRE and the second voltage circuit RPRE can perform a voltage output operation to initialize nodes or circuits included in the subpixel SP or charge the same to a specific voltage level. The first voltage circuit SPRE and the second voltage circuit RPRE can include a first reference voltage source VPRES and a second reference voltage source VPRER, respectively. The first voltage circuit SPRE can output a first reference voltage based on the first reference voltage source VPRES, and the second voltage circuit RPRE can output a second reference voltage based on the second reference voltage source VPRER. The first reference voltage can be set to a voltage lower than the second reference voltage.

The sampling circuit SAM can perform a sampling operation to acquire a sensing voltage through the first reference line VREF1. For example, the sampling circuit SAM can acquire the sensing voltage from a sensing capacitor PCAP formed on the first reference line VREF1 based on the sensing capacitor PCAP.

The analog-to-digital converter ADC can convert the analog sensing voltage acquired by the sampling circuit SAM into a digital sensing voltage and output the same. For example, the analog-to-digital converter ADC can convert the analog sensing voltage charged in the sensing capacitor PCAP into a digital sensing voltage and output the same.

The timing controller 120 can receive a sensing voltage (sensing data value) from the sensing circuit 145. The timing controller 120 can determine whether the driving transistor DT or organic light emitting diode OLED included in the subpixel SP has deteriorated based on the sensing voltage and perform an operation to compensate for the deterioration. Additionally, the timing controller 120 can determine the presence or absence of a defect in the light emitting display device based on the sensing voltage and perform an operation to notify of or remove the defect.

As shown in FIG. 11, according to the first example, the light emitting display device can perform a sequential sensing method in which sensing is performed from the first gate line GL1 to the M-th gate line GLm of the display panel 150. Although FIG. 11 illustrates an example in which sensing is performed sequentially starting from the first gate line GL1, which is the top of the display panel 150, sensing can start from the M-th gate line GLm, which is the bottom of the display panel 150.

As shown in FIG. 12, according to the second example, the light emitting display device can perform a random sensing method in which only an I-th gate line GLi of the display panel 150 is sensed. Although FIG. 12 illustrates an example in which only the I-th gate line GLi, which is one of specific gate lines, is sensed, the sensing target can be two or more gate lines.

Figure 13:
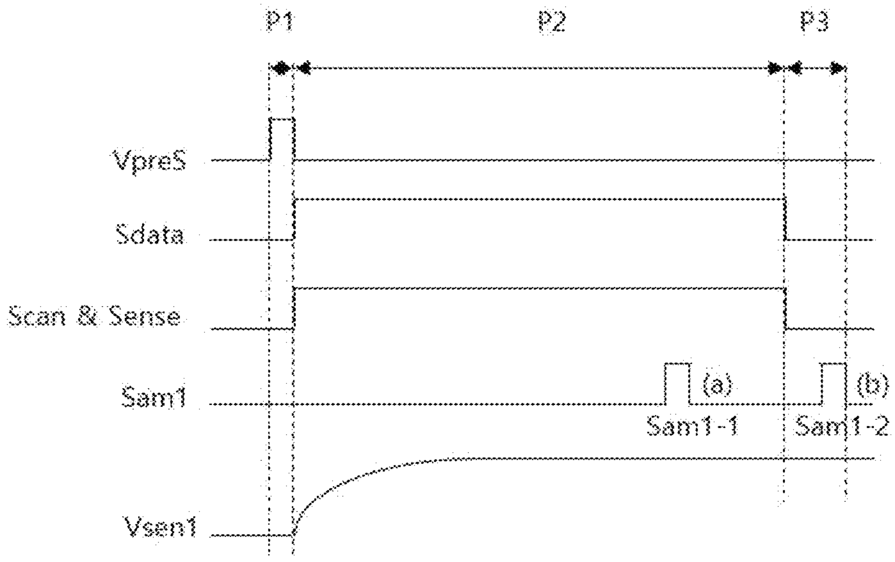
FIG. 13 is a driving waveform diagram illustrating a first sensing step for determining the presence or absence of a defect in a light emitting display device according to an embodiment of the present disclosure.
Figure 14:
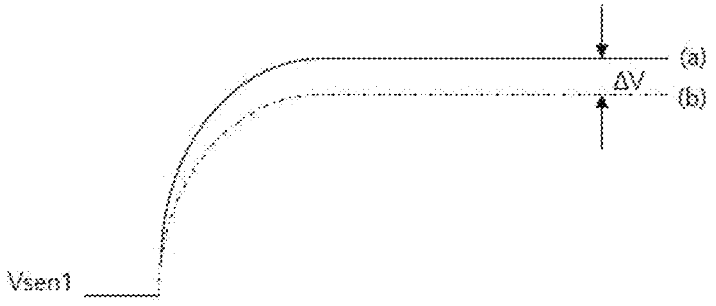
FIG. 14 is a diagram showing the difference between sensing voltages sensed in the first sensing step according to an embodiment of the present disclosure.
Figure 15:
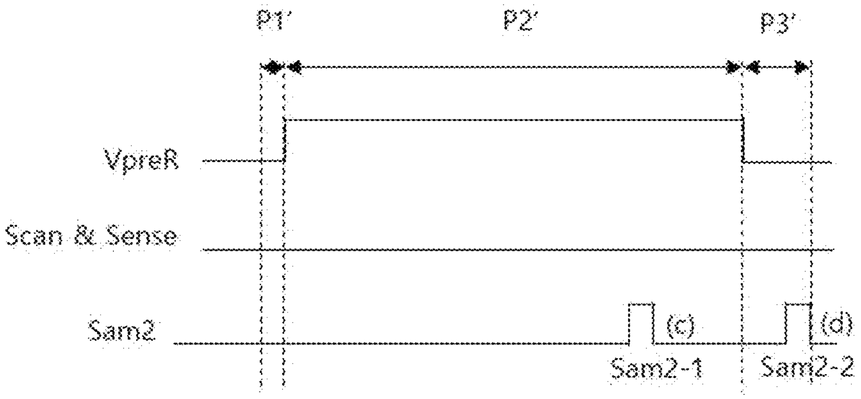
FIG. 15 is a driving waveform diagram illustrating a second sensing step for determining the presence or absence of a defect in the light emitting display device according to an embodiment of the present disclosure.
Figure 16:
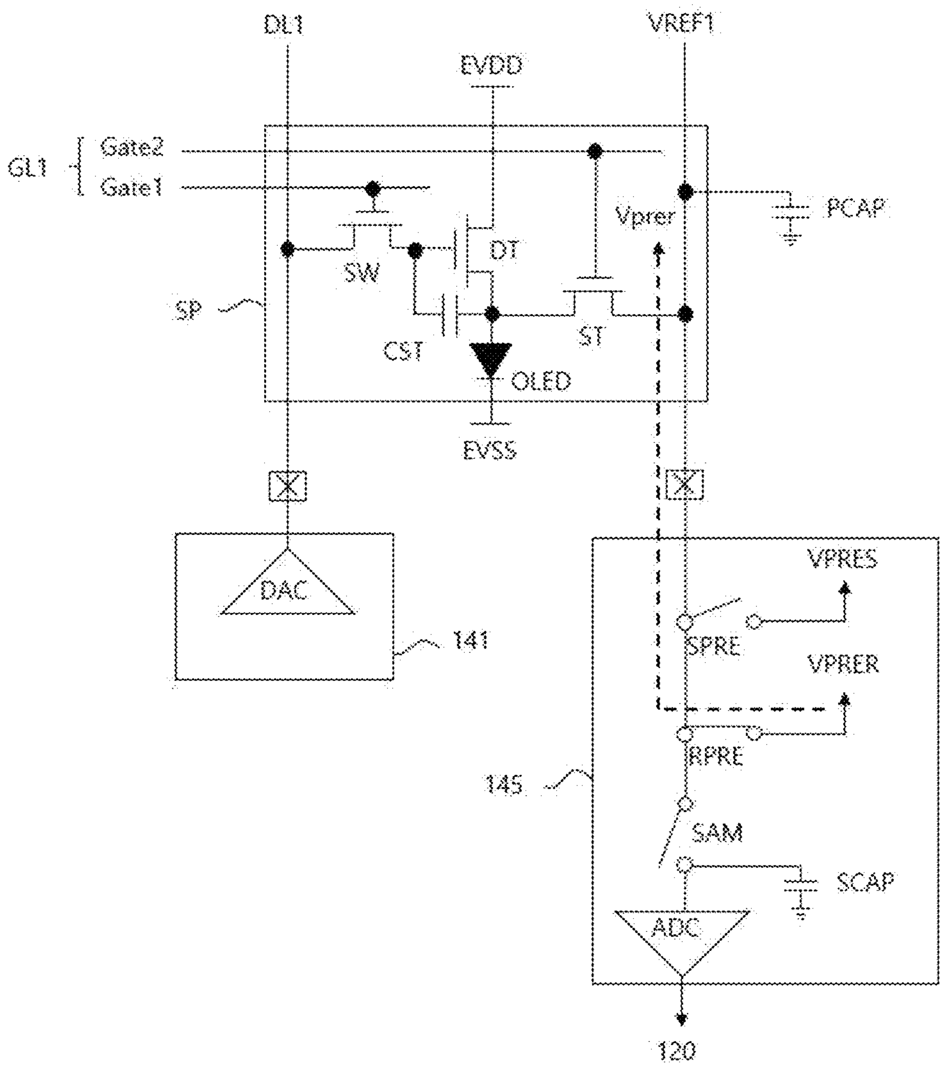
FIG. 16 and FIG. 17 are diagrams showing device operation performed in the second sensing step according to embodiments of the present disclosure.
Figure 17:
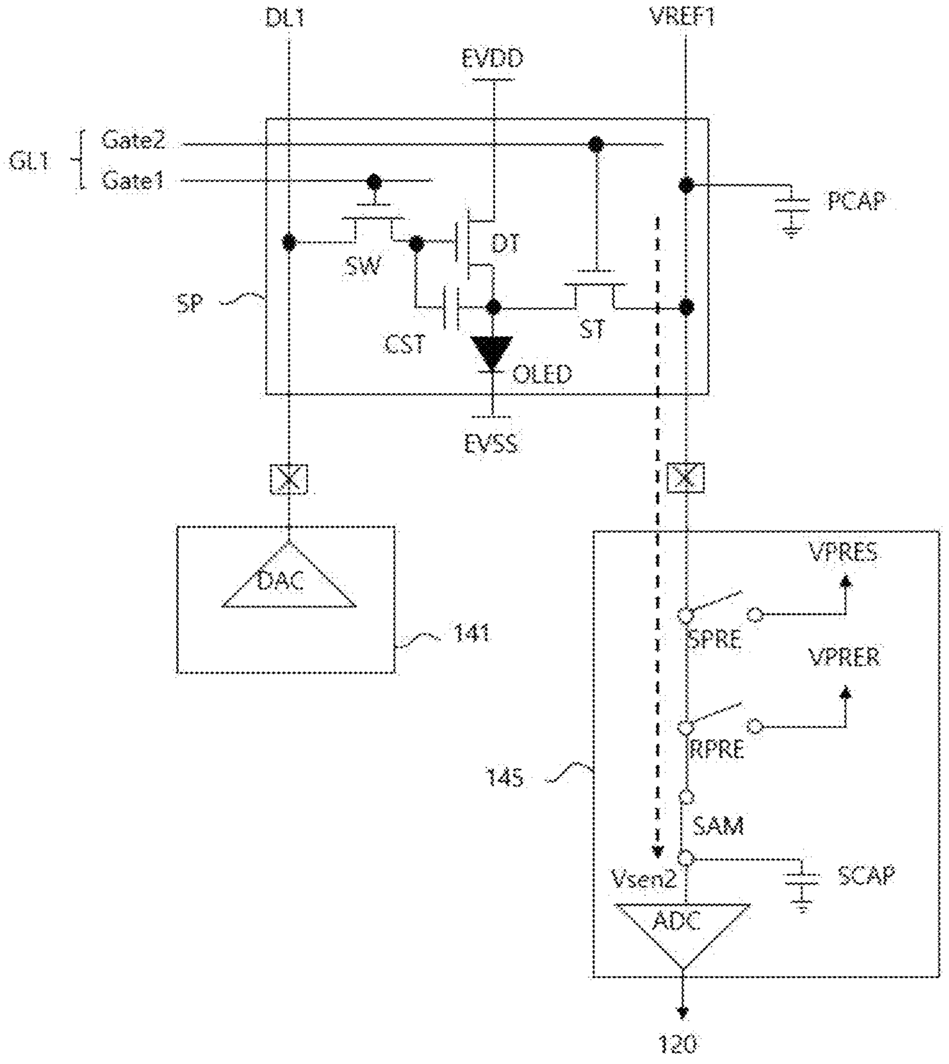

FIG. 13 is a driving waveform diagram illustrating a first sensing step for determining the presence or absence of a defect in a light emitting display device according to an embodiment, FIG. 14 is a diagram showing the difference between sensing voltages sensed in the first sensing step, FIG. 15 is a driving waveform diagram illustrating a second sensing step for determining the presence or absence of a defect in the light emitting display device according to the embodiment, and FIG. 16 and FIG. 17 are diagrams showing device operation performed in the second sensing step.

As shown in FIG. 9, FIG. 10, FIG. 13, and FIG. 14, the light emitting display device according to the embodiment can sense the display panel during at least one of a first operation period PWR_ON, a second operation period DISPLAY, and a third operation period PWR_OFF in order to determine the presence or absence of a defect.

An operation of determining whether there is a defect in the light emitting display device during the first operation period PWR_ON or the third operation period PWR_OFF excluding the second operation period DISPLAY can be performed in order to cause the display panel to be operable at an appropriate time. Hereinafter, an example in which determination of the presence or absence of a defect in the light emitting display device is performed through the first sensing step shown in FIG. 13 and the second sensing step shown in FIG. 15 will be described. However, the first sensing step can be performed in the first operation period PWR_ON and the second sensing step can be performed in the third operation period PWR_OFF.

As shown in FIG. 10 and FIG. 13, the first sensing step is a step of primarily determining the presence or absence of a defect between the display panel and the data driver that drives the display panel based on a method of randomly sensing a specific gate line of the display panel or a method of sequentially sensing all gate lines of the display panel. The first sensing step can include a (1-1)-th sensing period P1, a (1-2)-th sensing period P2, and a (1-3)-th sensing period P3. Hereinafter, the first subpixel will be defined as a sensing target subpixel, and the operation performed in the first sensing step will be described. The first sampling control signal Sam1 shown in FIG. 13 can include a (1-1)-th sampling control signal Sam1-1 and a (1-2)-th sampling control signal Sam1-2.

During the (1-1)-th sensing period P1, a first reference voltage can be applied to the first reference line VREF1 of the first subpixel included in the display panel. During the (1-1)-th sensing period P1, the first voltage circuit SPRE including the first reference voltage source VPRES can be turned on in response to a first voltage circuit control signal VpreS at a high voltage. The first voltage circuit control signal VpreS can be applied as a high voltage during the (1-1)-th sensing period P1 and then changed to a low voltage. During the (1-1)-th sensing period P1, the sensing node of the driving transistor DT included in the first subpixel can be initialized by the first reference voltage.

During the (1-2)-th sensing period P2, a sensing data voltage Sdata can be applied to the first data line DL1 of the first subpixel included in the display panel. During the (1-2)-th sensing period P2, a first scan signal and a first sensing signal Scan & Sense at a high voltage can be applied to the first scan line Gate1 and the second scan line Gate2. The switching transistor SW (e.g., scan) and the sensing transistor ST (e.g., sense) included in the first subpixel can be turned on by the high-voltage first scan signal and first sensing signal Scan & Sense. The first scan signal and the first sensing signal Scan & Sense can be applied as a high voltage during the (1-2)-th sensing period P2 and then changed to a low voltage.

During the (1-2)-th sensing period P2, the driving transistor DT of the first subpixel can perform a source follower operation by the sensing data voltage Sdata. A first sensing voltage Vsen1 applied to the sensing node of the first subpixel drops to the first reference voltage level, then gradually increases, and saturates to a voltage level close to the threshold voltage due to the source follower operation of the driving transistor DT.

During the (1-2)-th sensing period P2, the sampling circuit SAM can be turned on in response to a temporarily generated (1-1)-th sampling control signal Sam1-1. During the (1-2)-th sensing period P2, the sampling circuit SAM can acquire the first sensing voltage Vsen1 applied to the sensing node of the first subpixel as a first sampling value a. The (1-1)-th sampling control signal Sam1-1 can be applied as a high voltage in the latter stage of the (1-2)-th sensing period P2 and then changed to a low voltage. The (1-1)-th sampling control signal Sam1-1 can be temporarily generated between the time at which the first sensing voltage Vsen1 saturates to a level close to the threshold voltage of the driving transistor DT and the time at which the first scan signal and the first sensing signal Scan & Sense change to a low voltage.

During the (1-3)-th sensing period P3, the sampling circuit SAM can be turned on in response to a temporarily generated (1-2)-th sampling control signal Sam1-2. During the (1-3)-th sensing period P3, the sampling circuit SAM can acquire the first sensing voltage Vsen1 applied to the sensing node of the first subpixel as a second sampling value b. The (1-2)-th sampling control signal Sam1-2 can be applied as a high voltage during the (1-3)-th sensing period P3 and then changed to a low voltage. The (1-2)-th sampling control signal Sam1-2 can be temporarily generated after a certain delay time after the first scan signal and the first sensing signal Scan & Sense change to low voltage.

The light emitting display device according to the embodiment can primarily determine the presence or absence of a defect between the display panel and the data driver that drives the display panel by comparing the first sampling value a with the second sampling value b. At this time, the determination can be performed by the timing controller 120, which receives the first sampling value a and the second sampling value b as the first sensing voltage Vsen1 in a digital form, or the image provider which is a higher device than the timing controller.

As shown in FIG. 14, if there is a first voltage difference ΔV between the first sampling value a and the second sampling value b acquired through two sensing processes, the timing controller 120 can store the number of the gate line where the voltage difference ΔV has occurred or the position of the subpixel where the voltage difference has occurred in a memory. On the other hand, if there is no first voltage difference ΔV between the first sampling value a and the second sampling value b, the timing controller 120 can control the device such that the second sensing step to be performed subsequently is omitted (skipped). According to an embodiment, if the first voltage difference ΔV between the first sampling value a and the second sampling value b is greater than a predetermined value, then the timing controller 120 can store the number of the corresponding gate line or subpixel which can indicate a defective threshold voltage of the driving transistor DT of that subpixel.

Accordingly, the first sensing step can sense whether or not there is an inappropriate change in the threshold voltage of the driving transistor DT for a given subpixel. Also, the first sensing step for sensing the threshold voltage of the driving transistor DT for a given subpixel can be performed during the first operation period PWR_ON (e.g., when powering on the display device) or the third operation period PWR_OFF (e.g., when turning off the display device).

As shown in FIG. 10 and FIG. 15 to FIG. 17, the second sensing step is a step of re-sensing the gate line or the subpixel where the voltage difference has occurred in the first sensing step to secondarily determine the presence or absence of a defect between the display panel and the data driver that drives the display panel. The second sensing step can include a (2-1)-th sensing period P1', a (2-2)-th sensing period P2', and a (2-3)-th sensing period P3'. The second sampling control signal Sam2 shown in FIG. 15 can include a (2-1)-th sampling control signal Sam2-1 and a (2-2)-th sampling control signal Sam2-2.

During the (2-1)-th sensing period P1', the first scan signal and the first sensing signal Scan & Sense at a low voltage can be applied to the first scan line Gate1 and the second scan line Gate2. The switching transistor SW and sensing transistor ST included in the first subpixel can be turned off by the low-voltage first scan signal and first sensing signal Scan & Sense.

During the (2-2)-th sensing period P2', a second reference voltage Vprer can be applied to the first reference line VREF1 of the first subpixel included in the display panel. During the (2-2)-th sensing period P2', the second voltage circuit RPRE including the second reference voltage source VPRER can be turned on in response to a second voltage circuit control signal VpreR at a high voltage. The second voltage circuit control signal VpreR can be applied as a high voltage during the (2-2)-th sensing period P2' and then changed to a low voltage. Since the switching transistor SW and sensing transistor ST included in the first subpixel are turned off during the (2-2)-th sensing period P2', the second reference voltage Vprer can be charged in the sensing capacitor PCAP of the first reference line VREF1 as a second sensing voltage Vsen2. Meanwhile, the second reference voltage Vprer can be changed to a higher level and output in order to improve determination as to the presence or absence of a defect. In other words, the first sensing operation can identify which subpixel or gate line likely has a defect (e.g., during a power on operation), and then the second sensing operation can be performed at a later time to retest that gate line or subpixel to more accurately measure if it is indeed defective (e.g., during a power off operation).

During the (2-2)-th sensing period P2', the sampling circuit SAM can be turned on in response to a temporarily generated (2-1)-th sampling control signal Sam2-1. During the (2-2)-th sensing period P2', the sampling circuit SAM can acquire the second sensing voltage Vsen2 charged in the sensing capacitor PCAP of the first reference line VREF1 of the first subpixel as a third sampling value c. The (2-1)-th sampling control signal Sam2-1 can be applied as a high voltage in the mid and late stage of the (2-2)-th sensing period P2' and then changed to a low voltage.

During the (2-3)-th sensing period P3', the sampling circuit SAM can be turned on in response to a temporarily generated (2-2)-th sampling control signal Sam2-2. During the (2-3)-th sensing period P3', the sampling circuit SAM can acquire the second sensing voltage Vsen2 charged in the sensing capacitor PCAP of the first reference line VREF1 of the first subpixel as a fourth sampling value d. The (2-2)-th sampling control signal Sam2-2 can be applied as a high voltage in the (2-3)-th sensing period P3' and then changed to a low voltage. The (2-2)-th sampling control signal Sam2-2 can temporarily occur after a certain delay time after the second voltage circuit control signal VpreR changes to a low voltage.

The light emitting display device according to the embodiment can secondarily determine the presence or absence of a defect between the display panel and the data driver that drives the display panel based on a second voltage difference between the third sampling value c and the fourth sampling value d. At this time, the determination can be performed by the timing controller 120, which receives the third sampling value c and the fourth sampling value d as the second sensing voltage Vsen2 in a digital form, or the image provider which is a higher device than the timing controller.

According to an embodiment, if the second voltage difference ΔV' between the third sampling value c and the fourth sampling value d is greater than a second predetermined value, then the timing controller 120 can accurately confirm that the corresponding gate line or subpixel is in fact defective.

Meanwhile, the timing controller 120 can secondarily determine whether there is a defect between the display panel and the data driver that drives the display panel by comparing a sampling value (or reference sampling value) obtained from a normal subpixel under the same driving conditions with the third sampling value c or the fourth sampling value d without deriving the second voltage difference. For example, either one of the third sampling value c or the fourth sampling value d can be compared with a sampling value of a normal subpixel (e.g., a subpixel that pass the test from the first sensing operation) and if the difference if greater than a predetermined value, then the then the timing controller 120 can accurately confirm that the corresponding gate line or subpixel is in fact defective.

According to an embodiment, is a subpixel is determined as being defect during one or both of the first sensing operation and the second sensing operation, then a compensation voltage can be applied to that subpixel during the display period.

Figure 18:
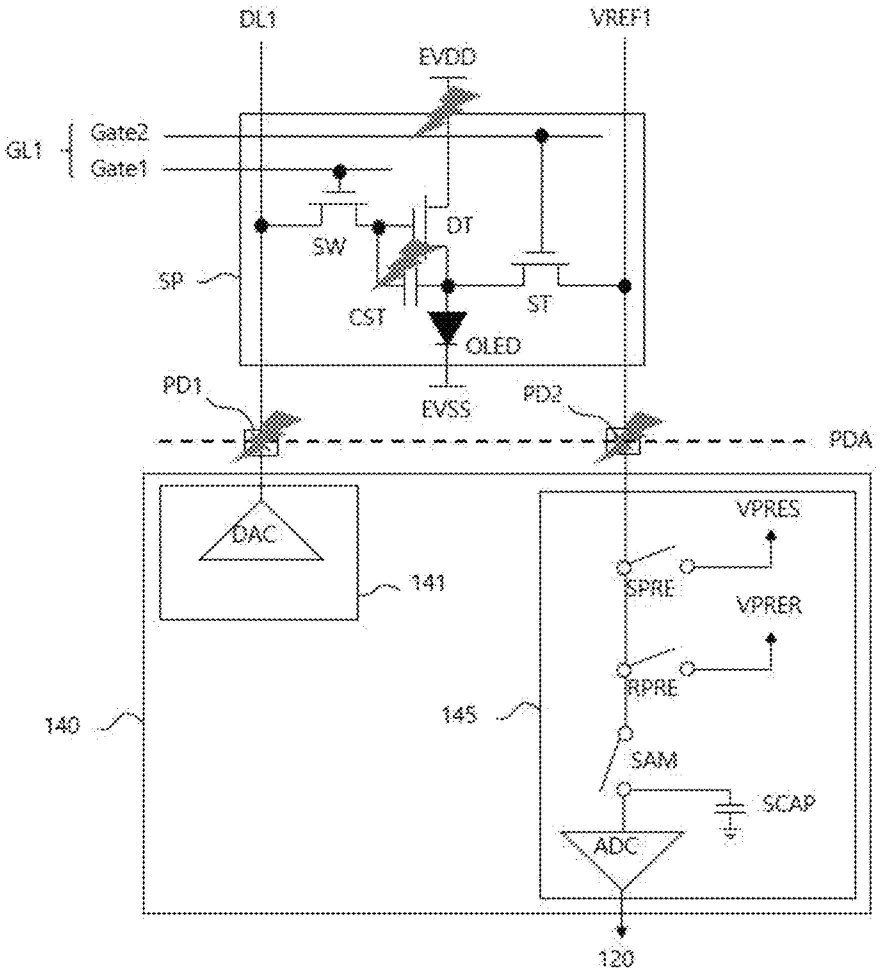
FIG. 18 is a diagram illustrating defects that can occur in an element, a signal line, and a power line of the light-emitting display device according to an embodiment of the present disclosure.
Figure 19:
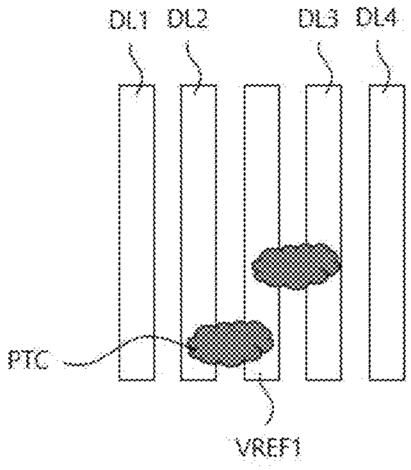
FIG. 19 is a diagram illustrating defects that can occur in signal lines of the light-emitting display device according to an embodiment of the present disclosure.

FIG. 18 is a diagram illustrating defects that can occur in an element, a signal line, and a power line of the light-emitting display device according to the embodiment, and FIG. 19 is a diagram illustrating defects that can occur in signal lines of the light-emitting display device according to the embodiment.

Hereinafter, an example in which the timing controller determines the presence or absence of a defect in the light emitting display device will be described.

As shown in FIG. 18 and FIG. 19, the display panel and the data driver 140 can be electrically connected to each other through pads PD1 and PD2 present in a pad area PDA (or bonding area). Additionally, a power line as well as signal lines DL1 and VREF1 electrically connecting the display panel and the data driver 140 can be present in the pad area PDA. Therefore, if there are open defects (or bonding defects) due to non-contact (non-contact due to crack) between the same type of signal lines in the pad area PDA (or bonding area) or short-circuit due to foreign substance (PTC) contact (or moisture permeable contact) between different types of signal lines, the sensing range can be exceeded or an incorrect sensing value can be obtained due to current leakage and the like.

An example in which the timing controller according to the embodiment comprehensively determines whether there is a defect in the light emitting display device based on the first voltage difference obtained in the first sensing step and the second voltage difference obtained in the second sensing step will be described below.

The timing controller 120 can determine whether there is a defect in an element (e.g., at least one of switching transistor SW, capacitor CST, driving transistor DT, organic light emitting diode OLED, and sensing transistor ST) included in the subpixel SP of the display panel, a power line EVDD or EVSS of the display panel, and signal lines DL1 and VREF1 located between the display panel and the data driver 140 based on the first voltage difference obtained in the first sensing step.

When the first voltage difference has occurred, elements included in a sensing target subpixel, and data lines and reference lines disposed between the sensing target subpixel and the data driver can be selected as a defect candidate group (e.g., likely defects can be identified for later retesting). In addition, when the second voltage difference has occurred, only the reference lines disposed between the sensing target subpixel and the data driver can be selected as a defect candidate group.

As a first example, when only the first voltage difference has occurred, the timing controller can determine at least one of elements included in the sensing target subpixel and the data lines and reference lines connected thereto as a defect factor. As a second example, when only the second voltage difference has occurred, the timing controller can determine that only the reference lines are defect factors. As a third example, when the first voltage difference and the second voltage difference have occurred, the timing controller can determine all of the elements included in the sensing target subpixel and the data lines and reference lines connected thereto as defect factors. Thus, by using the first sensing operation and the second operation, the timing controller can determine with finer granularity which parts of the subpixel are defective.

Further, the timing controller can include a lookup table in which defect determination data by which whether there is a defect in components included in the light emitting display device can be determined based on the first voltage difference and the second voltage difference is stored. In this situation, the timing controller can more easily determine which component has a defect according to increase or decrease in the first voltage difference or the second voltage difference. Here, the defect determination data can be prepared through tests.

Figure 20:
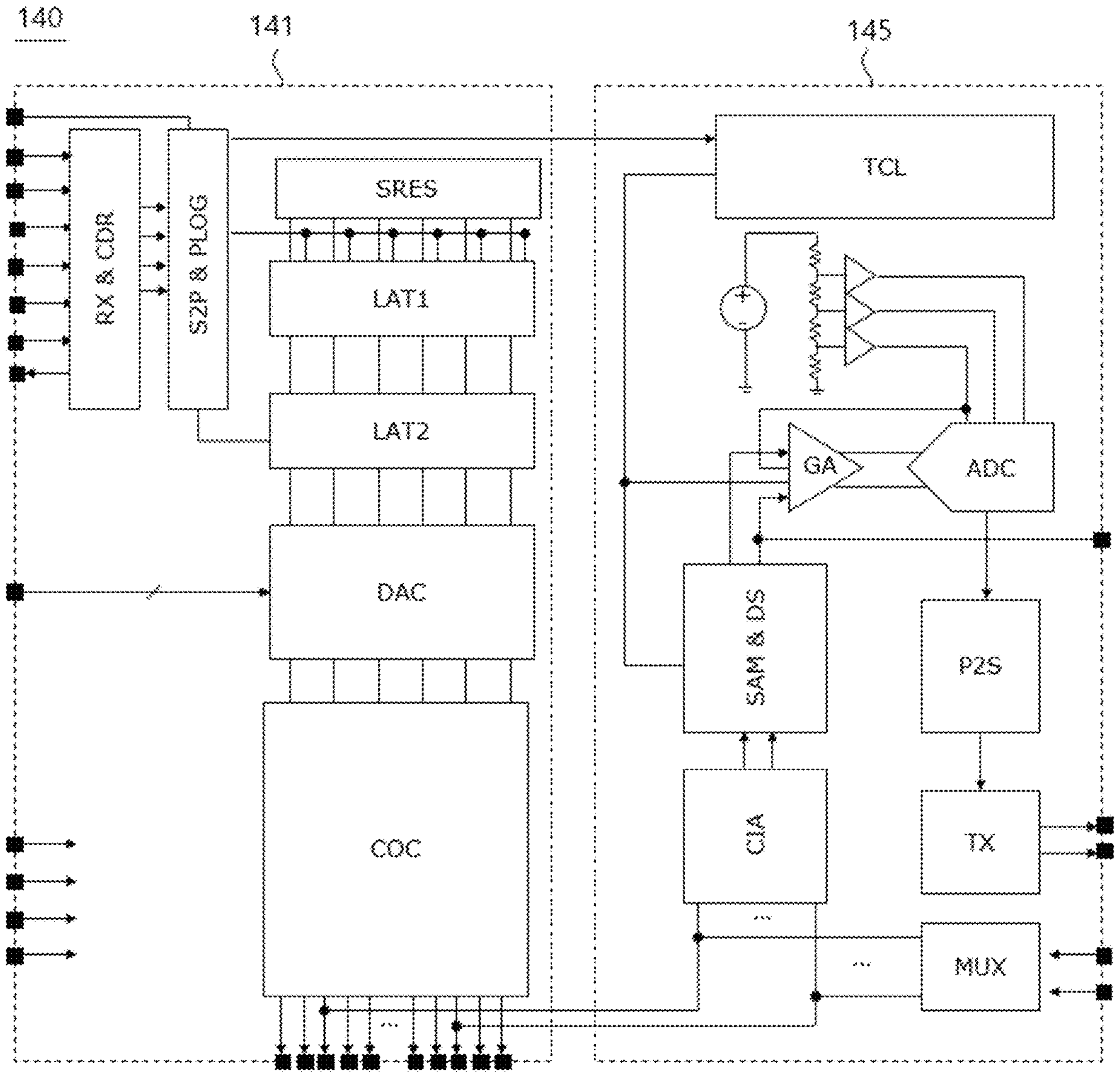
FIG. 20 is a block diagram illustrating the internal configuration of the data driver according to an embodiment of the present disclosure.
Figure 21:
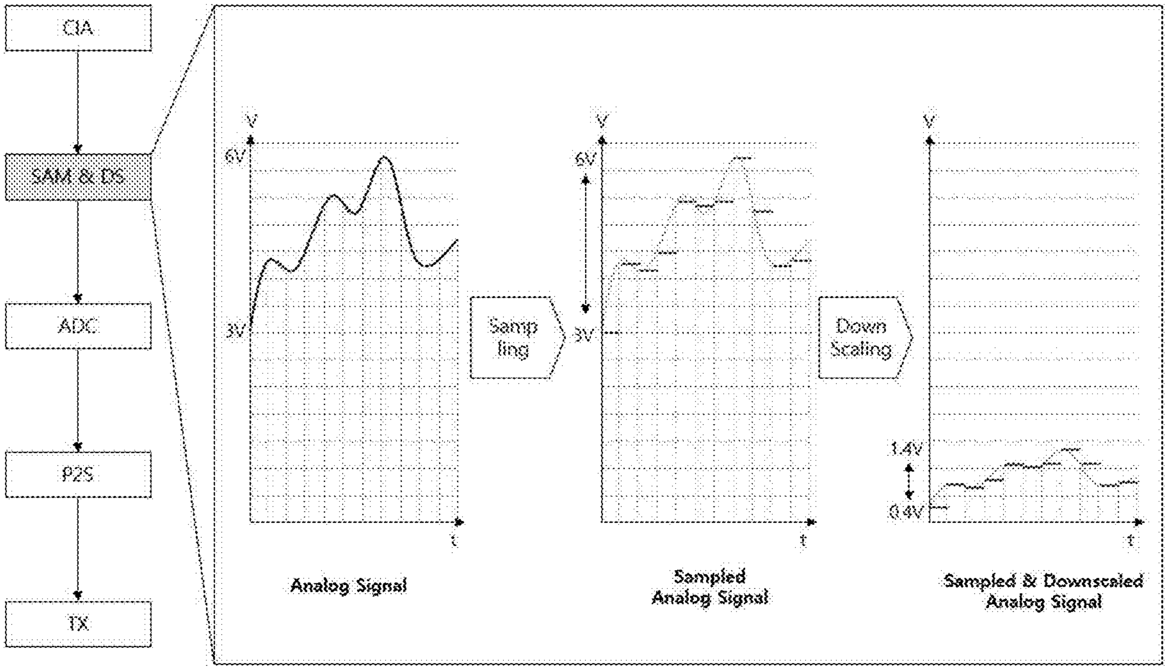
FIG. 21 to FIG. 23 are flowcharts illustrating a process of processing a sensing voltage into a digital form that can be transmitted to the timing controller based on the data driver of FIG. 20 according to embodiments of the present disclosure.
Figure 22:
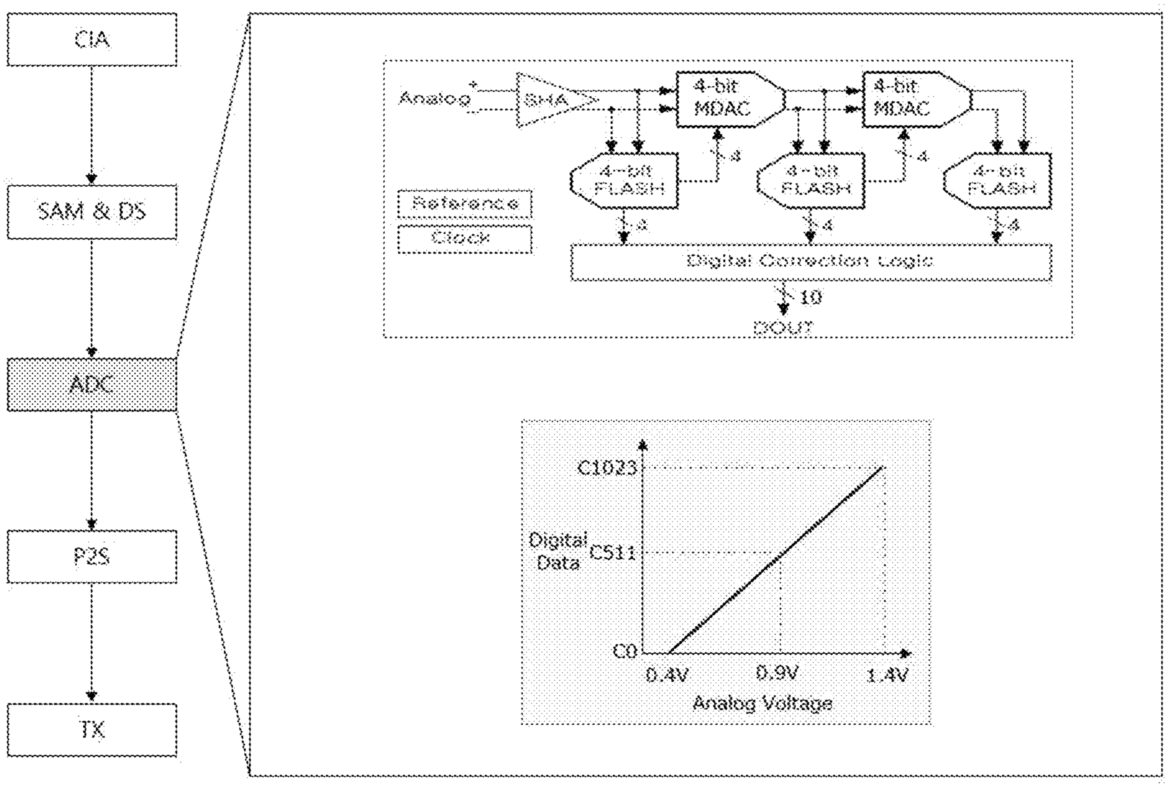
Figure 23:
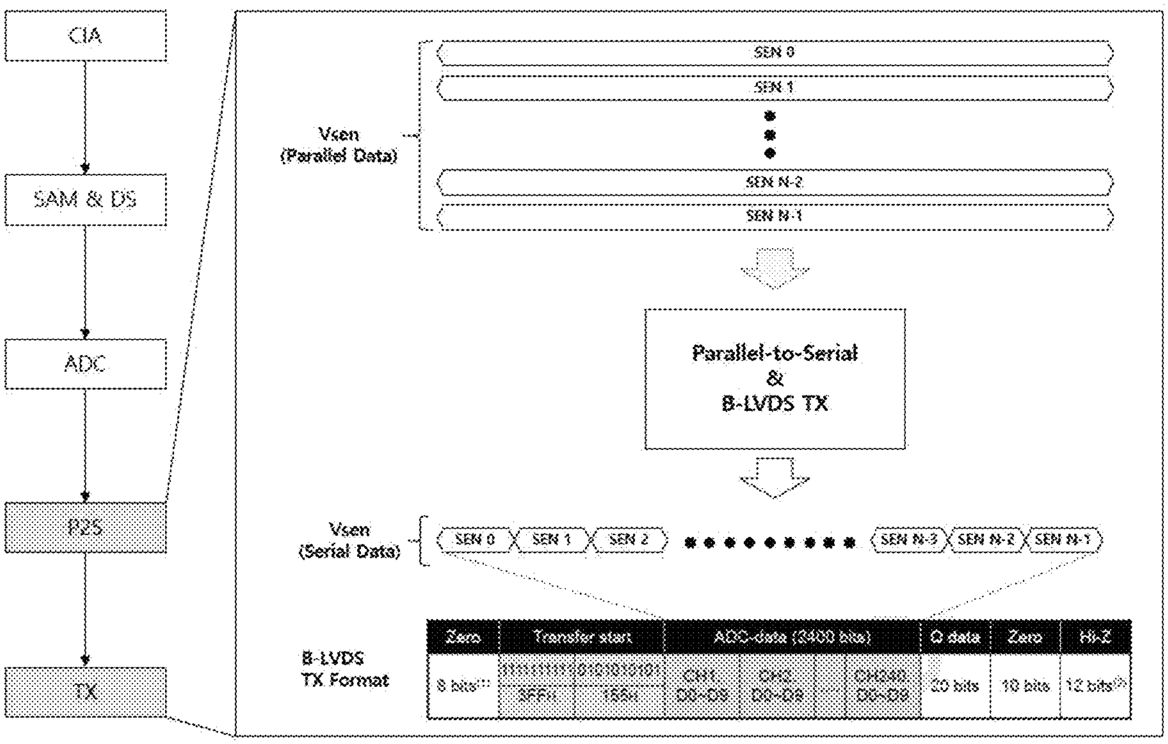

FIG. 20 is a block diagram illustrating the internal configuration of the data driver according to an embodiment, and FIG. 21 to FIG. 23 are flowcharts illustrating a process of processing a sensing voltage into a digital form that can be transmitted to the timing controller based on the data driver of FIG. 20.

As shown in FIG. 20, the data driver 140 according to the embodiment can include a driving circuit 141 and a sensing circuit 145. The driving circuit 141 can include a data reception and recovery unit RX & CDR, a first data processing and logic unit S2P & PLOG, a shift register SRES, a first latch LAT1, a second latch LAT2, a digital-to-analog converter DAC, and an output circuit COC.

The data reception and recovery unit RX & CDR can serve to receive and process packet data transmitted from the timing controller and to recover errors in reception of a data signal or a clock signal included in the packet data if the errors have occurred.

The first data processing and logic unit S2P & PLOG can serve to convert a serial signal output from the data reception and recovery unit RX & CDR into a parallel signal and to separately output a control signal to be applied to a controller TCL and a data signal to be applied to the first latch LAT1.

The shift register SRES can serve to generate a signal such that the data signal applied to the first latch LAT1 or the second latch LAT2 is sampled and latched for one line.

The first latch LAT1 and the second latch LAT2 can serve to sample, latch, and output the data signal output from the first data processing and logic unit S2P & PLOG for one line. Here, the second latch LAT2 can output a data signal based on a source output enable signal output from the first data processing and logic unit S2P & PLOG.

The digital-to-analog converter DAC can serve to convert a digital data signal output from the second latch LAT2 into an analog data voltage based on a gamma reference voltage and output the analog data voltage.

The output circuit COC can serve to perform additional modulation, such as amplifying the data voltage output from the digital-to-analog converter DAC, and then output the same through a data channel.

The sensing circuit 145 can include the controller TCL, a sensing processor CIA, a multiplexer MUX, a sampling and downscaling unit SAM & DS, a gain amplifier GA, an analog-to-digital converter ADC, a second data processor P2S, and a data transmitter TX. The controller TCL can serve to control the operation timing of elements included in the sensing circuit 145 based on a control signal output from the first data processing and logic unit S2P & PLOG.

The sensing processor CIA can serve to acquire a sensing voltage through a sensing channel connected to a reference line, process the sensing voltage, and output the processed sensing voltage. The sensing processor CIA can be configured according to the sensing method of the sensing circuit 145. For example, the sensing processor CIA can be configured as a current integration circuit or a voltage sensing circuit.

The multiplexer MUX can serve to selectively output first and second reference voltages applied from the outside. The multiplexer MUX can include a first voltage circuit that outputs the first reference voltage and a second voltage circuit that outputs the second reference voltage.

The sampling and downscaling unit SAM & DS can serve to sample the sensing voltage acquired by the sensing processor CIA and to downscale the sensing voltage. As shown in FIG. 20 and FIG. 21, the sampling and downscaling unit SAM & DS can sample the sensing voltage in the form of an analog signal output from the sensing processor CIA into a sampled analog signal and downscale the sampled analog signal to output the same as a sampled and downscaled analog signal.

The gain amplifier GA can serve to control the gain of the sensing voltage output from the sampling and downscaling unit SAM & DS.

The analog-to-digital converter ADC can serve to convert the analog sensing voltage output from the gain amplifier GA into a digital sensing voltage (e.g., sensing data value) and output the digital sensing voltage. As shown in FIG. 20 and FIG. 22, the analog-to-digital converter ADC can output the analog sensing voltage output from the sampling and downscaling unit SAM & DS as a digital sensing voltage. Meanwhile, the circuit blocks (e.g., SHA, MDAC, FLASH, Digital Correction Logic), analog voltage, and digital data in FIG. 22 are illustrated to facilitate understanding of the detailed circuit configuration of the analog-to-digital converter ADC and the conversion method according thereto, and thus detailed description will be omitted.

The second data processor P2S can serve to process parallel digital sensing voltages output from the analog-to-digital converter ADC into a serial digital sensing voltage. As shown in FIG. 20 and FIG. 23, the second data processor P2S can process parallel digital sensing voltages Vsen (e.g., Parallel Data) output from the analog-to-digital converter ADC into a serial digital sensing voltage Vsen (e.g., Serial Data).

The data transmitter TX can serve to transmit the serial digital sensing voltage output from the second data processor P2S to the timing controller. As shown in FIG. 20 and FIG. 23, the data transmitter TX can configure the digital sensing voltage Vsen (e.g., Parallel Data) output from the second data processor P2S in a bus-low voltage differential signaling transmission format and transmit the same to the timing controller. Meanwhile, since the transmission format in FIG. 23 is illustrated to facilitate understanding of data packets, detailed description thereof will be omitted.

As described above, the present disclosure has the effect of improving the lifespan of a display device by compensating for elements included in subpixels constituting a display panel and the effect of enhancing driving stability and driving reliability of the display device by detecting the presence or absence of defects in the overall display device including the display panel and a driver that drives the display panel.

It will be apparent to those skilled in the art that various modifications and variations can be made in the present disclosure without departing from the spirit or scope of the present disclosure. Thus, it is intended that the present disclosure cover the modifications and variations of the present disclosure provided they come within the scope of the appended claims and their equivalents.

What is claimed is:

1. A display device comprising:

a display panel including a subpixel having a switching transistor connected to a data line and a sensing transistor connected to a reference line;

a driving circuit connected to the data line;

a sensing circuit connected to the reference line; and a timing controller configured to control at least one of the driving circuit and the sensing circuit, wherein the sensing circuit is configured to:

in response to applying a first reference voltage to the subpixel through the reference line during a first sensing period, acquire a first sensing voltage charged in the reference line as a first sampling value during a period when the switching transistor and the sensing transistor are turned on and acquire the first sensing voltage charged in the reference line as a second sampling value during a period when the switching transistor and the sensing transistor are turned off, and wherein the timing controller is configured to:

determine that the display device has a defect based on a first difference value between the first sampling value and the second sampling value.

2. The display device of claim 1, wherein the sensing circuit is further configured to:

in response to applying a second reference voltage different from the first reference voltage to the subpixel through the reference line during a second sensing period when the switching transistor and the sensing transistor are turned off, acquire a second sensing voltage charged in the reference line as a third sampling value during a period when the second reference voltage is applied to the reference line and acquire the second sensing voltage charged in the reference line as a fourth sampling value during a period when the second reference voltage is not applied to the reference line.

3. The display device of claim 2, further comprising a data driver including the driving circuit and the sensing circuit, wherein the timing controller is further configured to determine that the display device has a defect based on a second difference value between the third sampling value and the fourth sampling value.

4. The display device of claim 2, wherein the second sensing period is scheduled to be performed when the first difference value is greater than a predetermined value, and wherein the second sensing period is skipped or not scheduled to be performed when the first difference value is less than the predetermined value.

5. The display device of claim 2, wherein the first sensing period and the second sensing period are included in a driving start period when power is applied to the display panel.

6. The display device of claim 2, wherein the first sensing period and the second sensing period are included in a driving termination period when the display panel is instructed to turn off.

7. The display device of claim 2, wherein the first sensing period is included in a driving start period when power is applied to the display panel, and wherein the second sensing period is included in a driving termination period when the display panel is instructed to turn off.

8. A method of controlling a display device, the method comprising:

applying, by a sensing circuit included in the display device, a first reference voltage to a reference line connected to a subpixel included in a display panel of the display device;

acquiring, by the sensing circuit, a first sensing voltage charged in the reference line as a first sampling value during a period when a switching transistor and a sensing transistor are turned on, and acquiring the first sensing voltage charged in the reference line as a second sampling value during a period when the switching transistor and the sensing transistor are turned off; and determining, by a timing controller in the display device, that the display device has a defect based on a first difference value between the first sampling value and the second sampling value.

9. The method of claim 8, wherein the first reference voltage is applied to the reference line during a first sensing period included in a driving start period when power is applied to the display panel.

10. The method of claim 8, further comprising:

applying a second reference voltage different from the first reference voltage through the reference line when the switching transistor and the sensing transistor are turned off; and acquiring a second sensing voltage charged in the reference line as a third sampling value during a period when the second reference voltage is applied to the reference line, and acquiring the second sensing voltage charged in the reference line as a fourth sampling value during a period when the second reference voltage is not applied to the reference line.

11. The method of claim 10, further comprising:

determining that the display device has a defect based on a second difference value between the third sampling value and the fourth sampling value.

12. The method of claim 10, wherein the second reference voltage is applied to the reference line during a second sensing period included in a driving termination period when the display panel is instructed to turn off.

13. The method of claim 10, further comprising:

determining that the display device has a defect based comparing either the third sampling value or the fourth sampling value with a sampling value obtained from a normal subpixel.

14. A display device comprising:

a display panel including a subpixel having a switching transistor connected to a data line and a sensing transistor connected to a reference line; and a controller configured to:

in response to applying a first reference voltage to the subpixel through the reference line during a first sensing period, sense a first sensing voltage charged in the reference line when the switching transistor and the sensing transistor are turned on and sense a second sensing voltage charged in the reference line when the switching transistor and the sensing transistor are turned off, and determine that the subpixel is a defect candidate based on a difference between the first sensing voltage and the second sensing voltage.

15. The display device of claim 14, wherein the controller is further configured to:

in response to determining that the subpixel is the defect candidate based on the first sensing period, retest the subpixel during a second sensing period by applying a second reference voltage different from the first reference voltage to the subpixel through the reference line when the switching transistor and the sensing transistor are turned off, sense a third sensing voltage charged in the reference line while the second reference voltage is being applied to the reference line and sense a fourth sensing voltage charged in the reference line while the second reference voltage not applied to the reference line, and determine that the subpixel is defective based on at least one of the third sensing voltage and the fourth sensing voltage.

16. The display device of claim 15, wherein the controller is further configured to:

in response to determining that the subpixel is defective, apply a voltage compensation value to the subpixel during a display period.

17. The display device of claim 15, wherein the controller is further configured to:

determine that the subpixel is defective based on a difference between the third sensing voltage and the fourth sensing voltage being greater than a predetermined value.

18. The display device of claim 15, wherein the controller is further configured to:

determine that the subpixel is defective based on comparing either the third sensing voltage or the fourth sensing voltage with a sampling value obtained from a normal subpixel, wherein the normal subpixel is not identified as a defect candidate during the first sensing period.

19. The display device of claim 15, wherein the controller is further configured to:

determine that a defect lies within the reference line connected to the subpixel based on at least one of the third sensing voltage and the fourth sensing voltage.

20. The display device of claim 14, wherein the first sensing period is included in a driving start period when power is applied to the display panel or a driving termination period when the display panel is instructed to turn off.

* * * * *